United States Patent [19]

Orimo et al.

[11] 3,988,404
[45] Oct. 26, 1976

[54] PROCESS FOR PRODUCING A FOAMED THERMOPLASTIC RESIN ARTICLE

[75] Inventors: Katsumi Orimo, Ichihara; Masao Azuma, Chiba; Takashi Shimano; Shoji Yamamoto, both of Ichihara, all of Japan

[73] Assignee: The Furukawa Electric Co., Ltd., Tokyo, Japan

[22] Filed: Oct. 2, 1974

[21] Appl. No.: 511,431

[30] Foreign Application Priority Data
Oct. 9, 1973  Japan.............................. 48-113485
Dec. 1, 1973  Japan.............................. 48-135591

[52] U.S. Cl................................ 264/45.9; 264/50; 264/54; 264/174
[51] Int. Cl.²........................................ B29D 27/00
[58] Field of Search............... 264/50, DIG. 10, 53, 264/DIG. 5, DIG. 13, 45.9, 54, 174; 425/4 C, 203, 245

[56] References Cited
UNITED STATES PATENTS

| | | | |
|---|---|---|---|
| 2,714,748 | 8/1955 | Stirnemann et al.................. | 264/50 |
| 2,751,627 | 6/1956 | Lindemann........................... | 264/50 |
| 2,768,407 | 10/1956 | Lindemann........................... | 264/50 |
| 3,054,146 | 9/1962 | Griffin................................ | 264/50 |
| 3,217,364 | 11/1965 | Genest.......................... | 264/DIG. 10 |
| 3,489,830 | 1/1970 | Grigull............................ | 425/203 X |
| 3,538,203 | 11/1970 | Overcashier et al................ | 264/53 |
| 3,806,291 | 4/1974 | Hendry............................ | 264/50 X |
| 3,879,155 | 4/1975 | Hendry............................ | 425/4 C |

*Primary Examiner*—Philip Anderson
*Attorney, Agent, or Firm*—Woodling, Krost, Granger & Rust

[57] ABSTRACT

This invention generally pertains to a process for producing a foamed thermoplastic resin article by utilizing the phenomenon that a solid thermoplastic resin sorbs a gas under pressure, and more particularly to a process for producing a foamed thermoplastic resin article comprising the steps of making a solid thermoplastic resin containing a nucleating agent quickly sorb a gas under a high pressure $P_1$, lowering said gas pressure to a low pressure $P_2$ ($P_1 > P_2 >$ the atmospheric pressure) when the gas sorption quantity reaches a predetermined value so as to equilibrate or stabilize said predetermined gas sorption quantity, feeding said gas sorbed thermoplastic resin into an extruder while said gas pressure is maintained at said low pressure $P_2$ and extruding the resultant resin to thereby produce a foamed thermoplastic resin article. In this invention, the gas sorbed by the thermoplastic resin contributes to foam in the thermoplastic resin.

21 Claims, 5 Drawing Figures

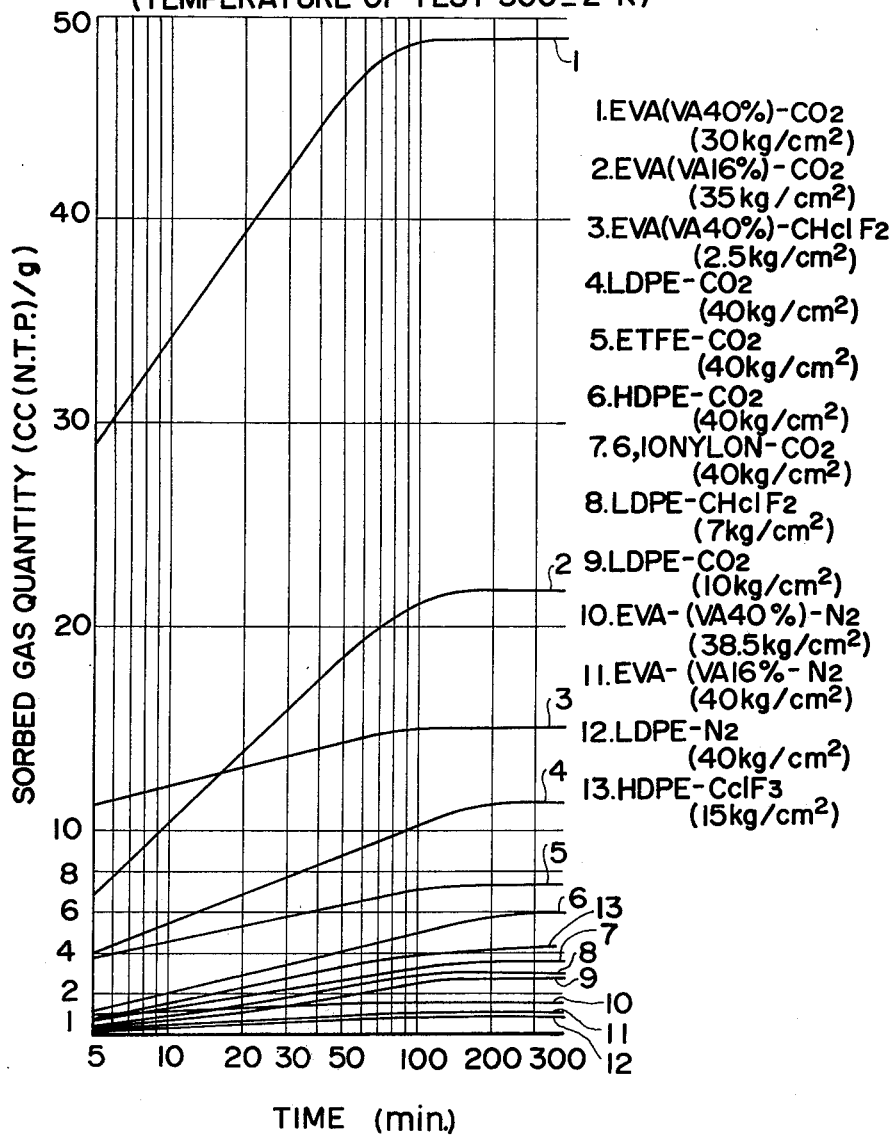

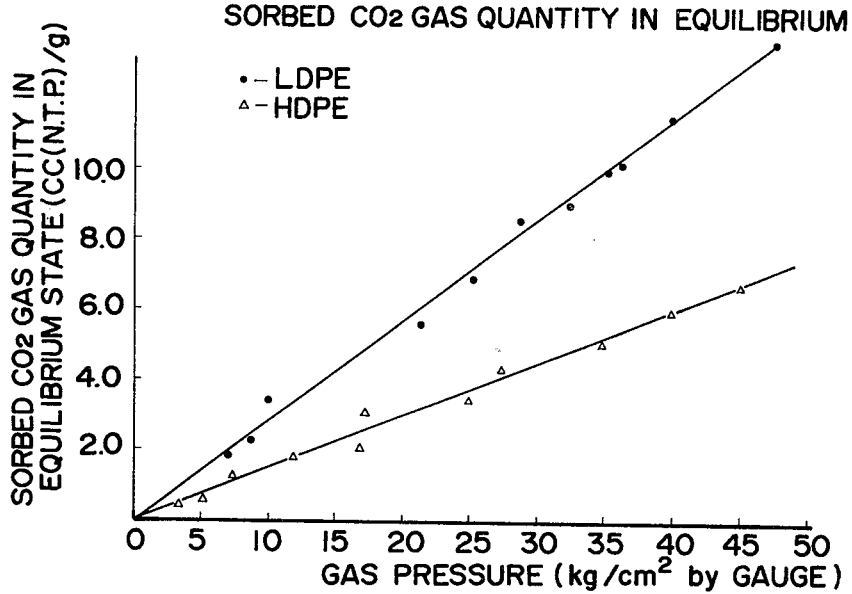
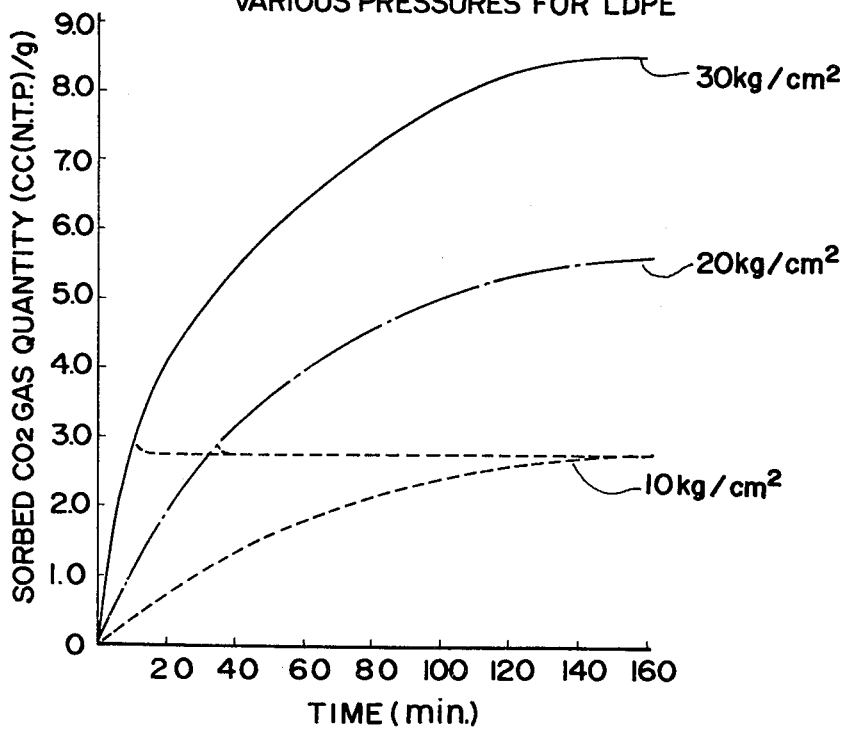

PROCESS FOR PRODUCING A FOAMED THERMOPLASTIC RESIN ARTICLE

FIELD OF THE INVENTION

This invention relates to a process for producing a foamed thermoplastic resin and an apparatus therefor. More particularly, this invention relates to a process and an apparatus for continuously producing a foamed thermoplastic resin by utilizing the phenomenon that a solid thermoplastic resin tends to sorb a gas under pressure. Also, this invention relates to a process for producing a thermoplastic resin insulation for a communication cable.

BACKGROUND OF THE INVENTION

It is well known to produce a foamed article by extrusion by feeding into an extruder a blend of a thermoplastic resin and a chemical blowing agent. This is called a chemical blowing method. In this method, initially the chemical blowing agent is thermally decomposed into gases within the extruder and then the resultant gases contribute to foam in the thermoplastic resin. Although this method is widely practiced, due to the products by the thermal decomposition other than gases, it has the following disadvantages; it is impossible to continuously operate the extruder for a long time because the products of the decomposition are formed on the surfaces of the screws, barrels, tips and dies of the extruder; the electrical properties of the foamed article tend to be deteriorated due to hygroscopicity of the products by the decomposition; and the produced foamed article tends to become discolored.

Meanwhile, it has been proposed to produce a foamed thermoplastic resin article by feeding into an extruder a blend of thermoplastic resin and a nucleating agent for foaming and forcibly injecting a foaming gas into the blend when it is melted within the extruder. This is called a gas foaming method. In this method, the gas injected into the molten resin grows into cells about the nucleating agent. With this method, there has been eliminated various influences due to the products by the decomposition of the foaming agent. However, this method has the difficulty to inject a constant quantity of gas into the molten resin always fluctuating in its pressure within the extruder, and therefore, to produce the foamed article having a uniform and constant expansion rate.

SUMMARY OF THE INVENTION

Accordingly, it is an object of the present invention to provide a process for producing a foamed thermoplastic resin article adapted to continuously operate an extruder for a long time.

It is another object of the present invention to provide a process for producing a foamed thermoplastic resin article having a uniform and constant foamed density.

It is further object of the present invention to provide a process for producing a foamed thermoplastic resin insulation for a communication cable having excellent electrical properties.

It is further object of the present invention to provide an apparatus suitable for practising the above-mentioned processes for producing the foamed thermoplastic resin article.

In order to accomplish the above objects, the present invention uses the phenomenon that solid thermoplastics tend to sorb gases under pressure.

In accordance with one aspect of the present invention, there is provided a process for producing a foamed thermoplastic resin article, comprising the steps of;

a. placing a solid thermoplastic resin containing a nucleating agent in a gas under a high pressure $P_1$ so that said thermoplastic resin quickly sorbs said gas in a quantity of generally predetermined value, which corresponds to the sorbed gas quantity in the equilibrium state under a low pressure $P_2$, said low pressure $P_2$ lower than said high pressure $P_1$ and higher than the atmospheric pressure;

b. placing said gas sorbed thermoplastic resin in said gas under said low pressure $P_2$ for maintaining the equilibrium state;

c. feeding said gas sorbed thermoplastic resin in the equilibrium state of said gas sorption quantity into an extruder while the gas pressure is maintained at $P_2$ and extruding said gas sorbed thermoplastic resin into said foamed thermoplastic resin article.

In accordance with another aspect of the present invention, there is provided an apparatus for producing a foamed thermoplastic resin article comprising;

a. a high pressure tank to be supplied with a solid thermoplastic resin containing a nucleating agent for foaming and a gas to be sorbed by said thermoplastic resin and in which said thermoplastic resin is maintained under a high pressure $P_1$ under which said thermoplastic resin quickly sorbs said gas to a predetermined quantity;

b. a low pressure tank connected to in series to said high pressure tank for receiving said thermoplastic resin therefrom and for being supplied with a gas and in which the pressure of said gas is maintained at a low pressure $P_2$ under which said predetermined gas sorption quantity is equilibrated and wherein $P_2$ is lower than $P_1$ and higher than the atmospheric pressure; and c. an extruder at its material feeding port connected to said low pressure tank for receiving said gas sorbed thermoplastic resin and melting and extruding said received thermoplastic resin for forming said foamed article.

BRIEF DESCRIPTION OF THE DRAWINGS

FIG. 1 is a graph showing the gas sorption quantity of thermoplastic resins versus time in case various thermoplastic resins are placed in gases under respective constant gas pressure;

FIG. 2 is a graph showing the sorbed gas quantity in the equilibrium state versus gas pressure for two specific thermoplastic resin;

FIG. 3 is a graph showing the sorbed gas quantity versus time under various pressures for a specific thermoplastic resin;

DETAILED DESCRIPTION OF THE PREFERRED EMBODIMENTS

Figure 4:
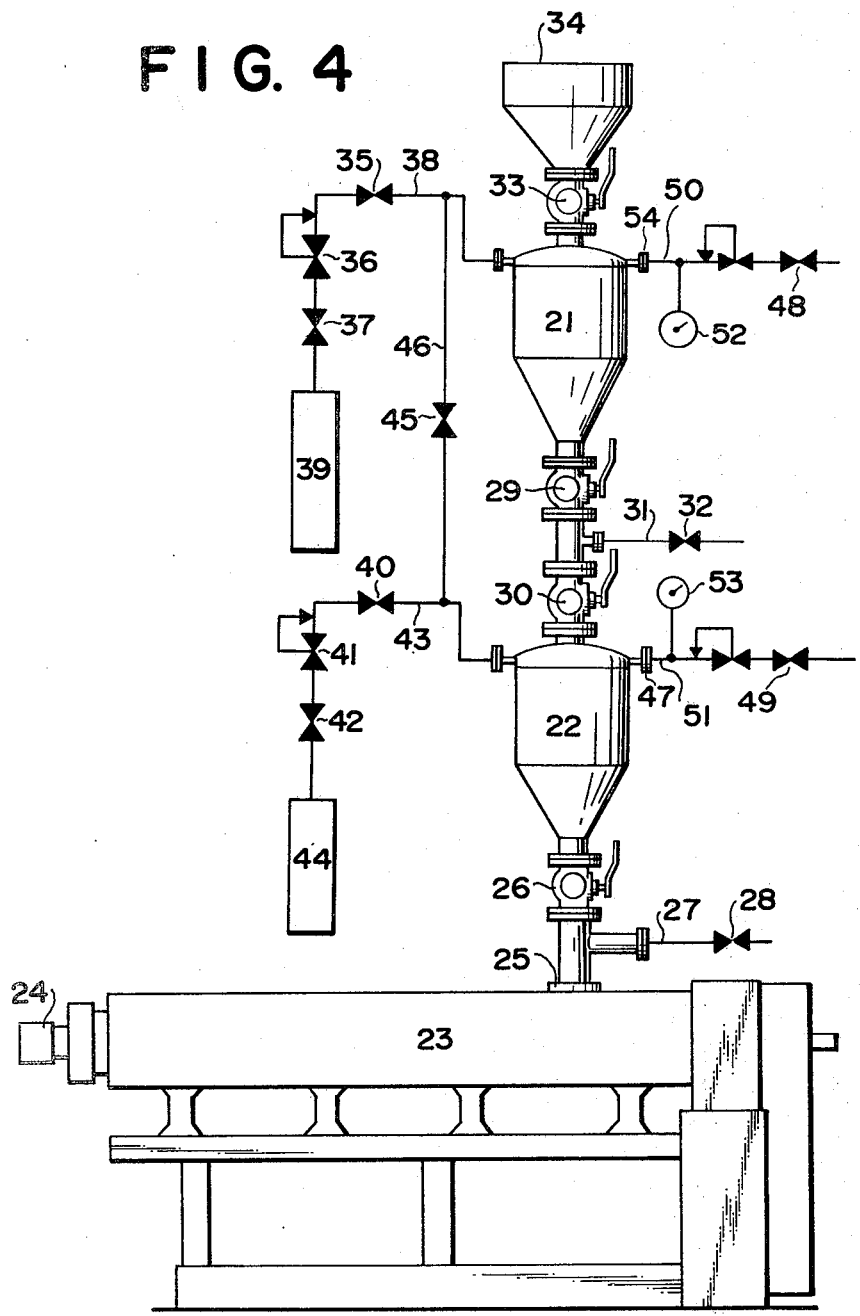
FIG. 4 is a schematic diagram of one embodiment of an apparatus for producing a foamed thermoplastic resin article in accordance with the present invention.

A solid thermoplastic resin tends to sorb a gas when it is placed in the gas under pressure. The "sorption" is the phenomenon that a solid not only adsorbs but also absorbs a gas. If a thermoplastic resin, while solid, and more accurately in the form of pellet when it is fed to an extruder, sorbs a gas of a quantity necessary for foaming in the thermoplastic resin, a foamed article can be produced by feeding to the extruder and extruding the gas sorbed thermoplastic resin.

FIG. 1 is a graph showing the sorption quantity versus time for various thermoplastic resins suitable for producing a foamed article when they are placed in various gases under constant pressure. The sorption quantity is expressed by volume (cc) of the sorbed gases at N.T.P. (Normal Temperature and Pressure) per 1 g of the thermoplastic resin. Various thermoplastic resins used for the tests were in the form of pellet. In FIG. 1, "EVA (VA 40%)" expresses copolymer of ethylene and vinylacetate (the vinylacetate content 40%), "LDPE" low density polyethylene, "ETFE" copolymer of ethylene and tetrafluoroethylene, "HDPE" high density polyethylene, "EVA (VA 16%)" copolymer of ethylene and vinylacetate (the vinylacetate content 16%), $CO_2$ carbon dioxide gas, $CHClF_2$ Freon 22 (the trade name), $CClF_3$ Freon 13 (the trade name), $N_2$ nitrogen gas, respectively. The abbreviated letters will be used hereinafter, if necessary.

In general, in order to foam in a thermoplastic resin, more than 0.2 cc in volume of a gas involved in the resin is required per 1 g of the resin. With the results of the tests shown in FIG. 1, it will be seen that a thermoplastic resin, when placed in a gas under proper pressure, can sorb the gas in a quantity necessary for foaming in the resin. It will be also noted that the gas sorption quantity of the thermoplastic resin reaches the equilibrium or saturated state under constant gas pressure when time lapses. In such equilibrium state, the quantity of gas involved in the thermoplastic resin is constant. This means that a foamed article of uniform and constant expansion rate can be produced by feeding to an extruder the thermoplastic resin having the gas sorption quantity in such equilibrium state.

FIG. 2 is a graph showing the sorbed gas quantity in the equilibrium state versus pressure of $CO_2$ gas with respect to LDPE and HDPE. In this specification, the term "sorbed gas quantity in the equilibrium state" means sorbed gas volume (cc at N.T.P.) per 1 g of thermoplastic resin when the gas sorption quantity is in the equilibrium state. The sorbed gas quantity in the equilibrium state tends to increase in a proportional relation to an increase in the pressure of $CO_2$ gas. This tendency is true of combination of other thermoplastic resins and gases.

Thus, the possibility to optionally change the sorbed gas quantity in the equilibrium state depending on a gas pressure corresponds to the possibility to optionally select the expansion rate of a foamed article by selecting the gas pressure when the article is produced.

FIG. 3 is a graph showing how $CO_2$ sorption quantity varies with time under various pressure of $CO_2$ in case of LDPE and $CO_2$. It will be noted from this figure that the higher the gas pressure is, the shorter the time required for the sorbed gas quantity's reaching a predetermined value. In other words, the higher the gas pressure, the more quickly the thermoplastic resin tends to sorb the gas. This tendency is true of any other thermoplastic resins and gases.

Using such tendency, a thermoplastic resin is initially made to quickly sorb a gas under a high pressure and when the sorbed gas quantity reaches a predetermined value the gas pressure can be lowered without any substantial liberation of the sorbed gas to a low pressure under which the sorbed gas quantity is maintained in the equilibrium state. Thus, the sorbed gas quantity can be balanced or stabilized in a shorter time. The embodiments will be described just-below with reference to FIG. 3. The sorbed gas quantity in the equilibrium state is about 2.75 cc/g under a pressure of 10 $kg/cm^2$. If the gas sorption treatment of LDPE is carried out under a pressure of 10 $kg/cm^2$ from beginning to end, it will take about more than 150 minutes to bring the sorbed gas quantity to the equilibrium state. On the other hand, if $CO_2$ gas under a pressure of 30 $kg/cm^2$ is initially sorbed by LDPE, it quickly sorbs $CO_2$ and it reaches the sorbed gas quantity of 2.75 cc/g in about 10 minutes. At that time, as soon as the gas pressure is lowered to 10 $kg/cm^2$, the equilibrium state is reached without any loss of the sorbed gas.

If a thermoplastic resin sorbs a gas while the gas pressure is maintained at constant value, it will take 1 to 3 hours until the equilibrium state is reached, as seen from FIG. 1. However, by controlling the gas pressure in two or more stages, the sorbed gas quantity required can be obtained and stabilized in a very shorter time. This is convenient to commercially produce a foamed thermoplastic resin article.

In the method of this invention, the pressure under which the thermoplastic resin sorbs a gas can be determined as follows; initially, the quantity of the gas sorbed by the thermoplastic resin (the sorbed gas quantity) is determined by the desired expansion rate of a foamed thermoplastic resin article to be produced. Thereafter, the pressure $P_2$ (higher than atmospheric pressure) is determined which is necessary for maintaining the sorbed gas quantity in the equilibrium state.

In producing a foamed thermoplastic resin article in accordance with the present invention, in the initial stage, a thermoplastic resin is held in a gas under the determined pressure $P_1$ for the given time $t$. When there has been reached the predetermined sorbed gas quantity, which corresponds generally to the sorbed gas quantity in the equilibrium state under the predetermined low pressure $P_2$, in the next stage, the gas pressure is lowered to the predetermined pressure $P_2$. The sorbed gas quantity is maintained and stabilized in the equilibrium state. Thus, the thermoplastic resin is fed into an extruder as it is, or while held under the pressure $P_2$. The resin is kneaded, melted and pressurized within the extruder. As soon as the molten resin leaves the die of the extruder, the gas included in the resin is released into the atmosphere, thereby expanding to foam in the resin.

In order to make cells minute and homogeneous, the resin may preferably be added with a nucleating agent for foaming. The addition of the nucleating agent to the resin may be effected prior to initially applying gas pressure. The nucleating agent causes at innumerable spots in the resin unevenness of thermal distribution, heterogeneity of viscosity and/or elasticity, or unevenness of a diffusion rate of a gas or a gas concentration distribution so that it facilitates occurrence of foaming. Materials used as the nucleating agent include powder material such as azodicarbonamide, OBSH (P,P'-Oxybis (Benzensulfonyl Hydrazide)), for example, which generates heat or gases by thermally decomposing within the extruder (thermally decomposable nucleating agent) and powder material such as talc and calcium carbonate, for example, which is never thermally decomposable approximately at the extrusion temperature (non-decomposable nucleating agent). If an amount of the nucleating agent to be added is too small, then cell distribution becomes heterogeneous, while if the amount is too great, the property of the resultant foamed article tends to be deteriorated. An amount of the nucleating agent to be added to 100 parts by weight of thermoplastic resin ranges preferably 0.01 to 0.5 parts by weight for the thermally decomposable nucleating agent and 0.1 to 5.0 parts by weight for the nondecomposable nucleating agent.

In principle, the process in accordance with the present invention is adapted to cause foam in all types of thermoplastic resin to be foamed. Thus, the kinds of thermoplastic resin are never limited. Thermoplastic resin especially suitable for practising the present invention includes LDPE, HDPE, EVA, ETFE, nylon, polypropylene (referred to as PP hereinafter) and polystyrene (referred to as PS hereinafter).

It should be noted that the kind of gases utilized by the present invention may be selected in view of much sorbed gas quantity and high safety in treatment. $CO_2$ and Freon gas are most suitable for the process of the present invention. $CO_2$ can be effectively sorbed by various thermoplastic resins and is free from human toxicity, explosion and corrosion with the result in highly safe operation. Freon gases such as $CClF_3$ and $CHClF_2$ can be also sorbed by various thermoplastic resin, and are also highly safe in treatment. Since these Freon gases are highly compatible with thermoplastic resin, they escape in a negligible amount from the thermoplastic resin where the resin leaving the die of the extruder and therefore, are adapted to manufacture the foamed thermoplastics article of high expansion rate. $N_2$ is one of the preferable gases because it can be sorbed in a quantity required for gas foaming by raising the gas pressure even though its sorption quantity is not so much relative to the above-mentioned gases.

The pressure $P_2$ under which the sorbed gas quantity of the thermoplastic resin is maintained in the equilibrium state, is determined by a desired expansion rate of the foamed thermoplastic resin article as previously described. However, since materials must be fed into the extruder at possibly high speed in order to effectively manufacture the foamed thermoplastic resin article, the sorbed gas quantity is required to reach the equilibrium state as soon as possible. Therefore, the gas pressure $P_1$ is required to be much higher than $P_2$, but the former cannot be more than the critical pressure at the temperature of the gas to be sorbed. If the gas pressure $P_2$ is higher than two-thirds as much as the critical pressure of the gas, the difference between the pressures $P_1$ and $P_2$ is reduced and therefore time required to reach the equilibrium state of the sorption becomes longer, resulting in poor effectiveness. Thus, the gas pressure $P_2$ is preferably lower than two-thirds as much as the critical pressure of the gas. In other words, the gas pressure $P_1$ is preferably more than one and half times of the gas pressure $P_2$ and at most the critical pressure.

The preferable range of the pressure $P_2$ depends on a combination of a thermoplastic resin and a gas, and is shown in Table I.

Table I

| Combinations | Preferred range of gas pressure $P_2$ at room temperature kg/cm² (by gauge) |
|---|---|
| HDPE - $CO_2$ | 4 to 33 |
| LDPE - $CO_2$ | 3 to 30 |
| EVA - $CO_2$ | 2 to 25 |
| PP - $CO_2$ | 6 to 40 |
| Nylon - $CO_2$ | 7 to 40 |
| ETFE - $CO_2$ | 5 to 40 |
| HDPE - $CClF_3$ | 3 to 25 |
| LDPE - $CClF_3$ | 3 to 25 |
| EVA - $CClF_3$ | 2 to 25 |
| PP - $CClF_3$ | 5 to 25 |
| Nylon - $CClF_3$ | 6 to 25 |
| ETFE - $CClF_3$ | 3 to 25 |

The process of the present invention is adapted to manufacture a foamed or cellular thermoplastic resin insulation of a communication cable. There has been used a foamed thermoplastic resin article of small dielectric constant ($\epsilon$) and dissipation factor (tan $\delta$) for an insulation of a balanced type or coaxial cable. Cellular plastics for electrical insulation are required to be homogeneous 38 minute over the entire length thereof and the cellular plastics produced by the present invention meets the requirements. If $CO_2$ is used as a gas to be sorbed by a thermoplastic resin, the considerably minute structure of foamed resin can be obtained and the $CO_2$ gas is adapted to produce a thin walled cellular resin. $CClF_3$ is also adapted to produce a highly expanded and thick walled insulation because it has a relatively high compatibility with a resin and a high boiling point. In order to form a highly expanded insulation of a coaxial cable for community antenna television (CATV), for example, $CClF_3$ is preferably utilized.

In forming a cellular resin insulation on a conductor, the gas sorbed resin is fed into an extruder where the conductor is covered by extrusion with the gas sorbed resin when passsing through the die thereof.

The process of the present invention may be effect by utilizing an apparatus for producing a foamed thermoplastic resin as shown in FIG. 4. The apparatus comprises a high pressure tank 21, a low pressure tank 22 and an extruder 23. The high pressure tank 21 is provided so that a thermoplastic resin can quickly sorb a gas in the tank 21 while the low pressure tank 22 is provided so that the sorbed gas quantity of the thermoplastic resin is maintained in the equilibrium state in the tank 22. The extruder 23 serves to melt by heat the gas sorbed resin while it is fed by rotation of a screw (not shown) and to extrude it out of the die within the head so as to form a cellular article of a predetermined shape. The extruder 23 at the rear end thereof is sealed in a gas tight manner because it is pressurized at the portion of material feeding port.

The material feeding port 25 of the extruder and the low pressure tank 22 are connected via a ball valve 26. The ball valve, when opened, permits the thermoplastic resin to pass therethrough, and when closed, is gastightly interrupted. A conduit 27 having a gas exhaust valve 28 is provided to be connected at the point between the ball valve 26 and the material feeding port 25. The gas exhaust valve 28 serves to release the gas within the extruder when the screw therein stops operating.

The high and low pressure tanks 21 and 22 are connected via two ball valves 29 and 30. A conduit 31 having a gas exhaust valve 32 is provided to be connected at the point between the ball valves 29 and 30. The gas exhaust valve 32 serves to release leakage gases so that the pressure in the high pressure tank 21 is prevented from affecting the pressure in the low pressure tank 22 due to the leakage from the ball valves 29 and 30. A hopper 34 is provided over the high pressure tank 21 and connected thereto via a ball valve 33.

The high presure tank 21 is connected to a high pressure gas supply 39 via a valve 35, a pressure regulating valve 36 and a main valve 37, while the low pressure tank 22 is connected to a low pressure gas supply 44 via a valve 40, a pressure regulating valve 41 and a main valve 42. Also, the high and low pressure tanks 21 and 22 are connected to each other via a conduit 46 having a valve 45. The pressure regulating valves 36 and 41 serve to control the secondary or outlet sides thereof and more particularly the pressures on the sides of the tanks 21 and 22 to become constant. The valves 35, 40 and 45 serve to communicate the high pressure tank 21 with either the high pressure gas supply 39 or the low pressure gas supply 44, or to communicate the low pressure tank 22 with either of the high pressure gas supply 39 or the low pressure gas supply 44, as described hereinafter in more detail. The main valves 37 and 42 serve to interrupt or disinterrupt the supplies 39 and 44 from the tanks 21 and 22.

The high and low pressure tanks 21 and 22 are provided with exhaust ports 54 and 47, respectvely to which are connected conduits 50 and 51 having respective gas exhaust valves 48 and 49. The gas exhaust valves 48 and 49 serve to lower the pressures within the tanks 21 and 22 from high to low level or from low to atmospheric level.

Now, we will describe the process for producing a foamed thermoplastic resin article by utilizing the abovementioned apparatus with respect to (a) initiation of operation of the extruder and (b) continuous operation of the extruder.

a. Initiation of operation of the extruder

Initially, it should be confirmed whether molten resin fills the cylinder of the extruder 23. This is necessary for prevention of leakage of the pressurized gases within the tank 22 from the side of the head 24 when gas sorbed thermoplastic resin is fed from the tank 22 into the extruder. Then, it should be confirmed whether all of the valves are closed. Thereafter, only the ball valves 33, 29 and 30 are open, and a thermoplastic resin in the form of pellet containing a nucleating agent is supplied from the hopper 34 to the pressure tanks 22 and 21. After the tanks 21 and 22 are charged with thermoplastics, the ball valve 33 is closed. Then, by opening the valves 37, 35 and 45, a gas is fed from the high pressure gas supply 39 into the tanks 21 and 22. At that time, the gas exhaust valves 48 and 49 may be momently opened so as to sweep the air in the tanks 21 and 22. The pressure within the tanks 21 and 22 is held at the level $P_1$ necessary for the thermoplastic resin to quickly sorb the gas, by means of the pressure regulating valve 36. After the lapse of predetermined time, the sorbed gas quantity of the thermoplastic resin reaches substantially the same value as the sorbed gas quantity in the equilibrium state under the low pressure $P_2$, and at that time the valve 35 is closed while the gas exhaust valves 48 and/or 49 are open, thereby lowering the gas pressure within the tanks 21 and 22 to the pressure $P_2$ under which the sorbed gas quantity of the resin is rapidly stabilized or equilibrated at the predetermined value. Then, by opening the valves 42 and 40, the tanks 21 and 22 are supplied with the same gases from the low pressure gas supply 44. The pressure within the tanks 21 and 22 are held at a constant value by the pressure regulating valve 41 even though there occurs slight gas leakage. Thus, the extruder initiates to be operated by feeding the gas sorbed resin into the extruder by opening the ball valve 26. The resin fed into the extruder is melted while conveyed through the cylinder and pressurized by rotation of a screw with thermoplastics pressurized, and extruded through the die within the head 24 to the atmosphere. At that time, as the resin is released from the pressure, the gas sorbed by the resin is expanded about the nucleating agent to thereby produce minute cells in the resin.

b. Continuous operation of the extruder

After such initiation of the operation of the extruder as above-mentioned, no manipulation is required until the high pressure tank 21 is fully vacated with the gas sorbed resin falling into the low pressure tank 22. Then, the high pressure tank 21 is interrupted from the low pressure tank 22 by closing the valve 45 and the ball valves 29 and 30. Next, the gas exhaust valve 48 is open so that the interior of the high pressure tank 21 is at atmospheric pressure for subsequent feeding of materials into the tank 21 and thereafter the gas exhaust valve 48 is closed. Then, by opening the ball valve 33, the resin with the nucleating agent added thereto is fed from the hopper 34 into the high pressure tank 21. After the tank 21 is charged with the resin, the ball valve 33 is closed and by opening the valve 35, the gas is injected from the high pressure gas supply 39 into the high pressure tank 21. Thus, the interior of the high pressure tank is again held under the high pressure $P_1$ for a predetermined time. At that time, the exhaust valve 32 is open so that the leakage gas through the ball valve 29 has no influence on the pressure within the low pressure tank 22. After the lapse of the predetermined time, the pressure within the high pressure tank 21 is lowered to the low pressure $P_2$ by closing the valve 35 and opening the exhaust valve 48. After the exhaust valve 48 is again closed, by opening the valve 45, the high pressure tank 21 is communicated with the low pressure gas supply 44. The just above-mentioned operation must be completed before the resin within the low pressure tank 22 is consumed. Then, by opening the ball valves 29 and 30, the resin treated in the high pressure tank 21 is fed into the low pressure tank 22. After the resin within the high pressure tank 21 falls down into the low pressure tank 22 until the former is vacated, the above-mentioned operation is again repeated. Thus, the low pressure tank 22 is always provided with the resin with the gas sorbed in a constant quantity, to be supplied to the extruder, which permits continuous operation of the extruder.

Figure 5:
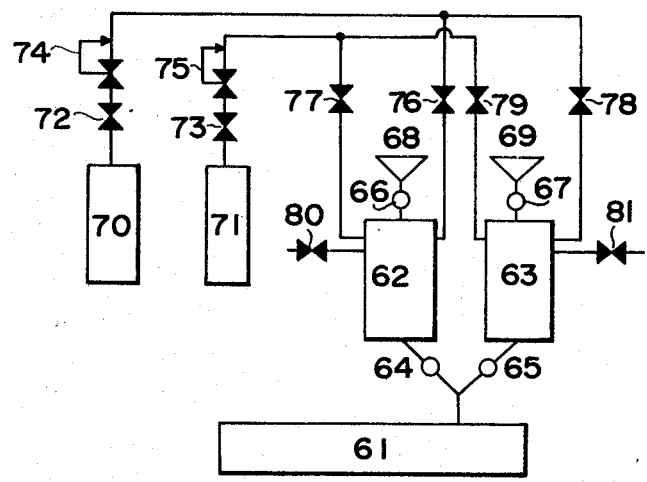
FIG. 5 is a schematic diagram of another embodiment of an apparatus for producing a foamed thermoplastic resin article in accordance with the present invention.

The apparatus of FIG. 4 comprises the low and high pressure tanks 22 and 21 connected in series to the extruder, but it is also possible to continuously operate the extruder by the apparatus comprising the two pressure tanks connected in parallel to the extruder. The schematic system of such apparatus is shown in FIG. 5. In this figure, numeral 61 designates an extruder, numerals 62 and 63 pressure tanks, numerals 64, 65, 66 and 67 ball valves, numerals 68 and 69 hoppers, numeral 70 a high pressure gas supply, numeral 71 a low pressure gas supply, numerals 72 and 73 main valves, numerals 74 and 95 pressure regulating valves, numerals 76, 77, 78 and 79 valves and numerals 80 and 81 gas exhaust valves. It will be seen from FIG. 5 that the pressure tanks 62 and 63 are connected in parallel to the extruder 61 and commonly to both of the high and low pressure gas supplies 70 and 71, respectively.

The process for producing a foamed thermoplastic resin article by utilizing the above-described apparatus will be described hereinafter.

Initially, it should be confirmed whether molten resin fills the cylinder of the extruder 61 and whether all of the valves and ball valves are closed. Next, by opening the ball valve 66, a thermoplastic resin in the form of pellet with a nucleating agent added thereto are supplied from the hopper 68 to the pressure tank 62. After the tank 62 is filled, the ball valve 66 is closed. Thereafter, by opening the valves 72 and 76, a gas is injected into the pressure tank 62. The interior of the tank 62 is held under the predetermined high pressure $P_1$ regulated by the pressure regulating valve 74. After the predetermined time lapses while the high pressure $P_1$ is applied within the tank 62, the pressure within the tank 62 is lowered to the low pressure $P_2$ required to equilibrate and stabilize the sorbed gas quantity by closing the valve 76 and momentarily opening the gas exhaust valve 80. Thereafter, by opening the valves 73 and 77, a gas under the low pressure $P_2$ is supplied from the low pressure gas supply 71 to the tank 62.

Since the tank 62 is provided with the thermoplastic resin having the gas sorbed at a predetermined quantity therein by the justabove-mentioned operation, the extruder 61 can initiate to be operated by opening the ball valve 64 and feeding it into the extruder 61. Thus, manufacturing a foamed thermoplastic resin article starts.

Meanwhile, before the pressure tank 62 is vacated, the other presssure tank 63 is provided with the same thermoplastic resin including the gas sorbed at a predetermined quantity in the same manner as described in connection with the pressure tank 62. As soon as the resin within the tank 62 is completely or substantially consumed, the gas sorbed resin within the pressure tank 63 is supplied to the extruder by opening the ball valve 65, thereby continuing the operation of the extruder 61. After the ball valve 65 is opened, the ball valve 64 and the valve 77 are closed and the gas exhaust valve 80 is opened. Thus, the interior of the tank 62 is again at the atmospheric pressure. Before the gas sorbed resin within the tank 63 is consumed, the pressure tank 62 is provided with the same thermoplastic resin including the gas sorbed in the predetermined quantity by repeating the above-mentioned operation. The continuous operation of the extruder can be effected by such repetition of the manipulation.

Some examples of the present invention will be described hereinafter. Unless otherwise indicated, all parts are indicated by weight hereinafter.

EXAMPLE 1

Thermoplastic resin:
  LDPE, MI (Melt Index) (190° C)
  0.3 g/10 min.
  density 0.920 g/cm$^3$
Gas:
  $CO_2$, $P_1$ = 20 kg/cm$^2$ 20 min.,
  $P_2$ = 4.0 kg/cm$^2$
Nucleating agent:
  Talc powder, added 1 part as against 100 parts of thermoplastics
Extruder:
  One for manufacturing an electric wire of 65 mm diameter
Capacitance measurement:
  Capacitance monitor manufactured by Muirhead Addision Co., Ltd. of England In this example, the apparatus of FIG. 4 was used. A copper wire of 0.65 mm outside diameter was covered by extrusion with a foamed insulation at the wire speed of 1100 m/min so as to obtain the outside diameter of 1.20 mm by the above conditions. As a result, after three minutes from the initiation of extrusion, the foamed insulation having a capacitance of 180 pF/m and an expansion rate of 28% could be extremely stably extruded in a continuous manner for 48 hours. The result of continuous measurement of capacitance during a period of three minutes to about 48 hours after the initiation of extrusion was 180 ± 1.5 pF/m. The fact that the capacitance is stable means that the cell structure and expansion rate of the resultant foamed insulation are constant and stable.

EXAMPLE 2

Thermoplastic resin:
  HDPE, MI (190° C) 0.5 g/10 min.,
  density 0.951 g/cm$^3$
Gas:
  $CO_2$, $P_1$ = 25 kg/cm$^2$ 20 min.,
  $P_2$ = 6.5 kg/cm$^2$
Nucleating agent:
  Talc powder added 1 part as against 100 parts of thermoplastic resin The conditions were the same as those of Example 1. except for the above. A copper wire of 0.5 outside diameter was covered by extrusion with a foamed insulation at a wire speed of 1500 m/min. so as to obtain the outside diameter of 0.74 mm. As a result, after about four minutes from the initiation of extrusion, the foamed insulation having a capacitance of 265 pF/min. and an expansion rate of 21%, could be extremely stably extruded in a continuous manner for 48 hours. The result of continuous measurement of capacitance during about 48 hours was 265 ± 2 pF/min.

COMPARISON 1

The same gas and thermoplastic resin as in Example 1 were charged in the pressure tanks and held under a pressure of 20 kg/cm$^2$ for 20 minutes. Thereafter, the pressure in the tank was lowered to the atmospheric pressure and the resulting resin was extruded to form a foamed insulation of the same size as that of Example 1 for an electric wire. As a result, foaming was observed immediately after the initiation of extrusion and the capacitance of the resultant foamed insulation was 200 pF/m. But, after about 100 minutes no foaming was observed.

After the pressure in the tank was held at 50 kg/cm$^2$ for 20 minutes, it was lowered to the atmospheric pressure and the similar extrusion as previously mentioned was effected. As a result, foaming was observed immediately after the initiation of extrusion and the resultant insulation had a capacitance of 145 pF/m, but foaming was rarely observed after about 130 minutes.

As understood from the two comparison tests, the gas sorbed by the thermoplastic resin under pressure contributes to foaming. It will be also understood that even if the thermoplastic resin sorbs the gas under pressure, when the gas sorbed resin is fed to the extruder at the atmospheric pressure, the sorbed gas quickly goes out of the resin, resulting in impossibility to stably manufacture a cellular resin article.

COMPARISON 2

The same gas and thermoplastic resin as in Example 1 were charged in the pressure tanks and held under a pressure of 4.0 kg/cm². Immediately thereafter, the resulting resin started to be extruded to form a foamed insulation of the same size as that of Example 1 for an electric wire. Foaming was rarely observed immediately after the initiation of extrusion and the resultant insulation had a capacitance of 250 pF/m which was much higher than that of Example 1. But, the expansion rate gradually increased for about an hour and 20 minutes until the resin in the pressure tank was consumed and the insulation had a capacitance of 195 pF/m after an hour and 20 minutes lapsed from the initiation. However, a fresh batch of resin was supplied to the extruder immediately before an initial batch of resin was consumed, the expansion rate of the foamed article was considerably reduced and the capacitance of the resultant insulation increased to 237 pF/m. Thereafter, the capacitance was gradually reduced. Each time when fresh batches of resin were switched, the expansion rate of the foamed article was considerably reduced. Thus, we could never observe stable foaming extrusion although it was done for 8 hours.

The same continuous extrusion were made in an identical manner, except for raising to 5.5 kg/cm² the pressure of $CO_2$ under which the thermoplastic resin sorbed the gas. In this case, the level of the capacitance was more or less lower, but no stable result could be observed.

It will be understood from the two tests that it is almost impossible to manufacture a foamed thermoplastic resin article of a stable expansion rate when a thermoplastic resin is fed into an extruder with a gas used as foaming agent only under pressure, that the gas sorbed by the thermoplastic resin contributes to foaming, and that if the sorbed gas quantity is unstable, foamed thermoplatic resin of a stable expansion rate can be never obtained.

COMPARISON 3

The same gas and thermoplastic resin as in Example 1 were charged in the pressure tanks and held under a pressure of 6.5 kg/cm² . Immediately thereafter, the extrusion started to form a foamed insulation of the same size as that of Example 1 for an electric wire. Foaming was rarely observed immediately after the initiation of extrusion and the resultant insulation had a capacitance of 320 pF/m which was much higher than that of Example 1.

But, the expansion rate gradually increased for about one hour and 30 minutes until the resin in the pressure tank was comsumed and the capacitance of the insulation obtained after about 1 hour and 30 minutes lapsed from the initiation was reduced to 275 pF/m. However, when a fresh batch of resin was supplied to the extruder immediately before an initial batch of the resin was consumed, the expansion rate of the foamed article was considerably reduced and the capacitance of the resultant insulation increased to 314 pF/m. Then, the capacitance was gradually reduced as the extrusion proceeded. Each time when fresh batches of resin were switched, the expansion rate of the foamed article was considerably reduced. Thus, we could never observe stable foaming extrusion although it was continuously done for 7 hours.

Such continuous extrusion was made in the identical manner, except for raising to 8.0 kg/cm² the pressure of $CO_2$ under which the thermoplastic resin sorbed the gas. In this case, the level of the capacitance was more or less lower, but no stable extrusion could be observed.

It will be also understood that the same result as in the Comparison 2 was obtained.

EXAMPLE 3

Thermoplastic resin:
  HDPE, MI (190° C) 0.35 g/10 min.,
  density 0.950 g/cm³
Gas:
  $CO_2$
Nucleating agent:
  ADCA (Azodicarbonamide), added 0.15 parts as against 100 parts of thermoplastic resin
Extruder:
  One for manufacturing an electric wire of 40 mm diameter, L/D = 28
Diameter of die: 1 mm
Extruding Temperature: 210° C
Cooling:
  Cooling by water in a water trough placed 15 cm below the outlet of the die of the extruder Measurement of
expansion rate*: Measuring by the specific gravity method $$*\text{expansion rate} = \frac{\text{volume of gas contained in foamed thermoplastic resin}}{\text{entire volume of foamed thermoplastic resin}}$$

The results when a cord was extruded from the die of the extruder in the above conditions were as in the following Table 2.

Table 2

| High Pressure $P_1$ (kg/cm²) | Sorption time (min.) | Low Pressure $P_2$ (kg/cm²) | Expansion Rate (%) | Observation |
|---|---|---|---|---|
| 10 | 17 | 3 | 6 | not uniform cell distribution |
| 15 | 17 | 4 | 14 | uniform and excellent cell distribution |
| 15 | 18 | 5 | 20 | '' |
| 30 | 19 | 10 | 41 | '' |
| 50 | 25 | 20 | 63 | '' |
| 54 | 37 | 30 | 74 | cells partially not uniform, but permissible |
| 54 | 44 | 33 | 75 | some of cells partially broken and rough surface |
| 54 | 52 | 36 | 75 | cells substantially broken and severely rough surface |

EXAMPLE 4

Thermoplastic resin:
  LDPE, MI (190° C) 0.31 g/10 min.
  density 0.920 g/cm³
Gas:
  $CO_2$ The conditions were the same as in Example 3 except for the above. The results were as in the following Table 3.

Table 3

| High Pressure $P_1$ (kg/cm²) | Sorption time (min.) | Low Pressure $P_2$ (kg/cm²) | Expansion (%) | Observation |
|---|---|---|---|---|
| 10 | 9 | 2 | 7 | cells observable, but not uniform |
| 10 | 12 | 3 | 15 | uniform and excellent cell distribution |
| 20 | 13 | 5 | 38 | '' |
| 30 | 16 | 10 | 60 | '' |
| 53 | 22 | 20 | 75 | '' |
| 53 | 33 | 30 | 79 | some of cells partially broken and communicated, but permissible |
| 53 | 40 | 32 | 80 | cells substantially broken and communicated and severely rough surface |

EXAMPLE 5

Thermoplastic resin:
 EVA (VA 16%), MI (190° C) 1.3 g/10 min.
 density 0.934 g/cm³
Gas:
 $CO_2$
Nucleating agent:
 OBSH (p,p'-Oxybis(Benzenesulfonyl Hydrazide)) added 0.2% as against 100 parts of thermoplastic resin
Extruding temperature:
 154° C The conditions were as the same as in Example 3 except for the above. The results were as in the following Table 4.

Table 4

| High Pressure $P_1$ (kg/cm²) | Sorption time (min.) | Low Pressure $P_2$ (kg/cm²) | Expansion Rate (%) | Observation |
|---|---|---|---|---|
| 5 | 8 | 1.0 | 6 | cells observable, but not uniform |
| 10 | 9 | 2.0 | 15 | uniform and excellent cell distribution |
| 10 | 14 | 3.0 | 22 | '' |
| 20 | 16 | 6.0 | 39 | '' |
| 30 | 17 | 10 | 66 | '' |
| 40 | 27 | 20 | 78 | '' |
| 53 | 27 | 25 | 81 | some of cells partially broken and communicated, but permissible |
| 53 | 32 | 30 | 83 | cells substantially broken and communicated and severely rough surface |

EXAMPLE 6

Thermoplastic resin:
 PP, MI (230° C) 1.5 g/10 min.
 density 0.903 g/cm³
Gas:
 $CO_2$
Extruding temperature:
 226° C The conditions were the same as in Example 3 except for the above. The results were as in the following Table 5.

Table 5

| High Pressure $P_1$ (kg/cm²) | Sorption time (min.) | Low Pressure $P_2$ (kg/cm²) | Expansion Rate (%) | Observation |
|---|---|---|---|---|
| 20 | 14 | 4 | 7 | cells observable, but not uniform |
| 20 | 18 | 6 | 15 | relatively uniform cell distribution |
| 30 | 24 | 10 | 28 | uniform and excellent cell distribution |
| 50 | 30 | 20 | 49 | '' |
| 53 | 48 | 30 | 60 | '' |
| 53 | 70 | 40 | 68 | cell diameter relatively greater, but permissible |

EXAMPLE 7

Thermoplastic resin:
 6,10 Nylon (Zytel 33 (trade name) manufactured by Du Pont Company)
Gas:
 $CO_2$
Extruding temperature:
 265° C The conditions were the same as in Example 3 except for the above. The results were as in the following Table 6.

Table 6

| High Pressure $P_1$ (kg/cm²) | Sorption time (min.) | Low Pressure $P_2$ (kg/cm²) | Expansion Rate (%) | Observation |
|---|---|---|---|---|
| 20 | 20 | 5 | 4 | cells observable, but not uniform |
| 30 | 26 | 7 | 12 | uniform cell distribution |
| 50 | 20 | 9 | 19 | uniform and excellent cell distribution |
| 53 | 38 | 20 | 41 | '' |
| 53 | 50 | 30 | 54 | '' |
| 53 | 70 | 40 | 62 | '' |

EXAMPLE 8

Thermoplastic resin:
 ETFE, density 1.72 g/cm³ (TEFZEL 200 (trade name) manufactured by Du Pont Company)
Gas:
 $CO_2$
Nucleating agent:
 Talc powder added 2 parts as against 100 parts of thermoplastic resin
Extruding temperature:
 317° C The conditions were the same as in Example 3 except for the above. The results were as in the following Table 7.

Table 7

| High Pressure $P_1$ (kg/cm²) | Sorption time (min.) | Low Pressure $P_2$ (kg/cm²) | Expansion Rate (%) | Observation |
|---|---|---|---|---|
| 10 | 16 | 3 | 5 | cells observable, but not uniform |
| 20 | 15 | 5 | 13 | uniform cell distribution |
| 30 | 18 | 8 | 19 | uniform and excellent cell distribution |

Table 7-continued

| High Pressure $P_1$ (kg/cm²) | Sorption time (min.) | Low Pressure $P_2$ (kg/cm²) | Expansion Rate (%) | Observation |
|---|---|---|---|---|
| 30 | 22 | 10 | 29 | " |
| 54 | 30 | 20 | 38 | " |
| 54 | 51 | 30 | 45 | " |
| 54 | 75 | 40 | 56 | " |

EXAMPLE 9

Thermoplastic resin:
 HDPE, MI(190° C) 0.35 g/10 min.,
 density 0.950 g/cm³
Gas:
 $CClF_3$
Extruding temperature:
 168° C The conditions were the same as in Example 3 exept for the above. The results were as in the following Table 8.

Table 8

| High Pressure $P_1$ (kg/cm²) | Sorption time (min.) | Low Pressure $P_2$ (kg/cm²) | Expansion Rate (%) | Observation |
|---|---|---|---|---|
| 10 | 8 | 2 | 5 | not uniform cell distribution |
| 10 | 12 | 3 | 12 | uniform cell distribution |
| 20 | 13 | 4 | 20 | uniform and excellent cell distribution |
| 30 | 16 | 10 | 41 | " |
| 35 | 40 | 20 | 61 | " |
| 35 | 55 | 25 | 73 | some of cells partially broken and communicated, but relatively better appearance |

EXAMPLE 10

Thermoplastic resin:
 LDPE, MI (190° C) 0.31 g/10 min.,
 density 0.920 g/cm³
Gas:
 $CClF_3$
Nucleating agent:
 Talc powder added 2.0 parts as against 100 parts of thermoplastic resin
Extruding temperature:
 149° C The conditions were the same as in Example 3 except for the above. The results were as in the following Table 9.

Table 9

| High Pressure $P_1$ (kg/cm²) | Sorption time (min.) | Low Pressure $P_2$ (kg/cm²) | Expansion Rate (%) | Observation |
|---|---|---|---|---|
| 10 | 9 | 2 | 8 | not uniform cell distribution |
| 10 | 13 | 3 | 16 | uniform and excellent cell distribution |
| 20 | 13 | 5 | 31 | " |
| 30 | 18 | 10 | 53 | " |
| 35 | 41 | 20 | 76 | " |
| 35 | 60 | 25 | 83 | cells partially broken and communicated, but good |

Table 9-continued

| High Pressure $P_1$ (kg/cm²) | Sorption time (min.) | Low Pressure $P_2$ (kg/cm²) | Expansion Rate (%) | Observation |
|---|---|---|---|---|
| | | | | appearance |

EXAMPLE 11

Thermoplastic resin:
 EVA (VA 16%), MI (190° C) 1.3 g/10 min.,
 density 0.934 g/cm³
Gas:
 $CClF_3$
Nucleating agent:
 Talc powder added 2.0 parts as against 100 parts of thermoplastic resin
Extruding temperature:
 141° C The conditions were the same as in Example 3 except for the above. The results were as in the following Table 10.

Table 10

| High Pressure $P_1$ (kg/cm²) | Sorption time (min.) | Low Pressure $P_2$ (kg/cm²) | Expansion Rate (%) | Observation |
|---|---|---|---|---|
| 10 | 6 | 1 | 6 | not uniform cell distribution |
| 10 | 9 | 2 | 13 | cells relatively greater, but uniformly distributed |
| 10 | 12 | 3 | 25 | " |
| 20 | 12 | 5 | 37 | " |
| 30 | 16 | 10 | 55 | " |
| 35 | 43 | 20 | 73 | foam partially broken, but good appearance |
| 35 | 61 | 25 | 81 | " |

EXAMPLE 12

Thermoplastic resin:
 PP, MI (230° C) 1.5 g/10 min.,
 density 0.903 g/cm³
Gas:
 $CClF_3$
Extruding temperature: 212° C The conditions were the same as in Example 3 except for the above. The results were as in the following Table 11.

Table II

| High Pressure $P_1$ (kg/cm²) | Sorption time (min.) | Low Pressure $P_2$ (kg/cm²) | Expansion Rate (%) | Observation |
|---|---|---|---|---|
| 20 | 17 | 4 | 9 | not uniform cell distribution |
| 20 | 20 | 5 | 16 | cells relatively greater, but uniformly distributed |
| 30 | 25 | 10 | 30 | " |
| 35 | 38 | 15 | 43 | " |
| 35 | 55 | 20 | 57 | " |
| 35 | 80 | 25 | 69 | foam partially disturbed, but good and appearance also good |

EXAMPLE 13

Thermoplastic resin:
  6,10 Nylon (Zytel 33 (trade name) manufactured by Du Pont Company)
Gas:
  $CClF_3$
Nucleating agent:
  Talc powder added 2.0 parts as against 100 parts of thermoplastic resin
Extruding temperature:
  263° C The conditions were the same as in Example 3 except for the above. The results were as in the following Table 12.

Table 12

| High Pressure $P_1$ (kg/cm²) | Sorption time (min.) | Low Pressure $P_2$ (kg/cm²) | Expansion Rate (%) | Observation |
|---|---|---|---|---|
| 15 | 21 | 4 | 5 | not uniform cell distribution |
| 20 | 21 | 6 | 14 | cells relatively greater, but uniformly distributed |
| 30 | 25 | 10 | 22 | " |
| 35 | 36 | 15 | 36 | " |
| 35 | 50 | 20 | 51 | " |
| 35 | 70 | 25 | 62 | " |

EXAMPLE 14

Thermoplastic resin:
  ETFE, density 1.72 g/cm³ (TEFZEL 200 (trade name) manufactured by Du Pont Company)
Gas:
  $CClF_3$
Nucleating agent:
  Talc powder added 2.0 parts as against 100 parts of thermoplastic resin
Extruding temperature:
  311° C The conditions were the same as in Example 8 except for the above. The results were as in the following Table 13.

Table 13

| High Pressure $P_1$ (kg/cm²) | Sorption time (min.) | Low Pressure $P_2$ (kg/cm²) | Expansion Rate (%) | Observation |
|---|---|---|---|---|
| 10 | 9 | 2 | 7 | not uniform cell distribution |
| 20 | 8 | 3 | 14 | uniform cell distribution |
| 20 | 13 | 4 | 22 | uniform cell distribution and good appearance |
| 20 | 19 | 6 | 30 | " |
| 30 | 25 | 10 | 42 | " |
| 35 | 39 | 15 | 52 | " |
| 35 | 50 | 20 | 59 | " |
| 35 | 66 | 25 | 66 | " |

While some preferred embodiments of the present invention have been described and illustrated in connection with the accompaying drawings, it will be apparent to those skilled in the art that various changes and modifications may be made without departing the spirit and scope of the present invention, which is intended to be defined only to the appended claims.

What is claimed is:

1. A process for producing a foamed thermoplastic resin insulation for a communication cable, comprising the steps of:
   a. feeding into a high pressure tank a solid particulate thermoplastic resin containing a nucleating agent for foaming;
   b. injecting a gas into said high pressure tank and maintaining the pressure of said gas at a high pressure $P_1$ for a predetermined time sufficient for said thermoplastic resin to quickly sorb said gas until a gas sorption quantity of predetermined value is reached;
   c. lowering said gas pressure within said high pressure tank to a low pressure $P_2$;
   d. transferring said gas sorbed thermoplastic resin within said high presure tank to a low pressure tank in which the gas pressure is held at a low pressure $P_2$ under which the gas sorption quantity of said thermoplastic resin is in the equilibrium state and wherein said pressure $P_2$ is lower than said pressure $P_1$ and higher than the atmospheric pressure;
   e. feeding said thermoplastic resin within said low pressure tank into an extruder while said gas pressure is maintained at pressure $P_2$ and extruding said thermoplastic resin on a conductor to form said foamed thermoplastic resin insulation thereon; and
   f. repeating said steps (a) to (d) to feed additional gas sorbed thermoplastic resin into said low pressure tank before said gas sorbed thermoplastic resin within said low pressure tank is all fed into said extruder.

2. A process for producing a foamed thermoplastic resin article, comprising the steps of:
   a. feeding into a high pressure tank a solid particulate thermoplastic resin containing a nucleating agent for foaming;
   b. injecting a gas into said high pressure tank and maintaining the pressure of said gas at a high pressure $P_1$ for a predetermined time sufficient for said thermoplastic resin to quickly sorb said gas until a gas sorption quantity of predetermined value is reached;
   c. lowering said gas pressure with said high pressure tank to a low pressure $P_2$;
   d. transferring said gas sorbed thermoplastic resin within said high pressure tank to a low pressure tank in which the gas pressure is held at a low pressure $P_2$ under which the gas sorption quantity of said thermoplastic resin is in the equilibirum state and wherein said pressure $P_2$ is lower than said pressure $P_1$ and higher than the atmospheric pressure;
   e. feeding said thermoplastic resin within said low pressure tank into an extruder while said gas pressure is maintained at pressure $P_2$ and extruding said thermoplastic resin to form said foamed article; and
   f. repeating said steps (a) to (d) to feed additional gas sorbed thermoplastic resin into said low pressure tank before said gas sorbed thermoplastic resin within said low pressure tank is all fed into said extruder.

3. A process as set forth in claim 1, wherein said high pressure $P_2$ is lower than two-thirds as much as the critical pressure of said gas at the temperature of said gas when it is sorbed by said thermoplastic resin.

4. A process as set forth in claim 1, wherein said gas comprises $CO_2$.

5. A process as set forth in claim 1, wherein said gas comprises $CClF_3$.

6. A process as set forth in claim 1, wherein said gas comprises $CHClF_2$.

7. A process as set forth in claim 1, wherein said thermoplastic resin comprises a resinous composition selected from the group consisting of low density polyethylene, high density polyethylene, copolymer of ethylene and vinylacetate, copolymer of ethylene and tetrafluoroethylene, nylon, polypropylene and a composition mainly including polystyrene and polyethylene.

8. A process as set forth in claim 1, wherein said nucleating agent for foaming comprises powder of material such as is thermally decomposable within said extruder and wherein the quantity of said powder added is 0.01 to 0.5 parts as against 100 parts of said thermoplastics.

9. A process as set forth in claim 1, wherein said nucleating agent for foaming comprises powder of material such as is not thermally decomposable within said extruder and wherein the quantity of said powder added is 0.1 to 5.0 parts as against 100 parts of said thermoplastic resin.

10. A process as set forth in claim 3, wherein said thermoplastic resin is high density polyethylene and wherein said low pressure $P_2$ ranges from 4 to 33 $kg/cm^2$.

11. A process as set forth in claim 4, wherein said thermoplastic resin is low density polyethylene and wherein said low pressure ranges from 3 to 30 $kg/cm^2$.

12. A process as set forth in claim 4, wherein said thermoplastic resin is copolymer of ethylene and vinylacetate and wherein said low pressure $P_2$ ranges from 2 to 25 $kg/cm^2$.

13. A process as set forth in claim 4, wherein said thermoplastic resin is polypropylene and wherein said low pressure $P_2$ ranges from 6 to 40 $kg/cm^2$.

14. A process as set forth in claim 4, wherein said thermoplastic resin is nylon and wherein said low pressure $P_2$ ranges from 7 to 40 $kg/cm^2$.

15. A process as set forth in claim 4 wherein said thermoplastic resin is copolymer of ethylene and tetrafluoroethylene and wherein said low pressure $P_2$ ranges from 5 to 40 $kg/cm^2$.

16. A process as set forth in claim 5, wherein said thermoplastic resin is high density polyethylene and wherein said low pressure ranges from 3 to 25 $kg/cm^2$.

17. A process as set forth in claim 5, wherein said thermoplastic resin is low density polyethylene and wherein said low pressure $P_2$ ranges from 3 to 25 $kg/cm^2$.

18. A process as set forth in claim 5, wherein said thermoplastic resin is copolymer of ethylene and vinylacetate and wherein said low pressure $P_2$ ranges from 2 to 25 $kg/cm^2$.

19. A process as set forth in claim 5, wherein said thermoplastic resin is polypropylene and wherein said low pressure $P_2$ ranges from 5 to 25 $kg/cm^2$.

20. A process as set forth in claim 5, wherein said thermoplastic resin is nylon and wherein said low pressure $P_2$ ranges from 6 to 25 $kg/cm^2$.

21. A process as set forth in claim 5, wherein said thermoplastic resin is copolymer of ethylene and tetrafluoroethylene and wherein said low pressure ranges from 3 to 25 $kg/cm^2$.

* * * * *